Aug. 14, 1934.  E. SCHNITZLER  1,969,858
PHOTOGRAPHIC ROLL FILM
Filed Dec. 1, 1932
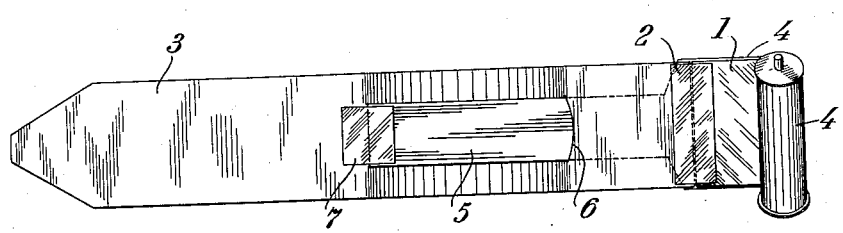
Inventor:
Edward Schnitzler,
By   Attorney
Philip S. Hopkins.

Patented Aug. 14, 1934

1,969,858

UNITED STATES PATENT OFFICE 1,969,858

PHOTOGRAPHIC ROLL-FILM

Eduard Schnitzler, Wolfen, near Bitterfeld, Germany, assignor to Agfa Ansco Corporation, Binghamton, N. Y., a corporation of New York Application December 1, 1932, Serial No. 645,288
In Germany December 11, 1931

1 Claim. (Cl. 95—9)

My present invention relates to photographic roll-films.

One of its objects is a roll-film with an improvement in fixing the film to the backing paper. Further objects will be seen from the detailed specification.

Reference is made to the accompanying drawing showing a conventional view of a roll-film according to my invention.

Photographic roll-films are usually wound together with a protective paper strip, whereto the film is attached at a certain distance from that end which is to be the free end of the strip in the roll; this end is hereinafter called the anterior end. When such a roll-film is unwound in the camera the winding spool first receives the anterior end of the protective paper strip and then the film together with the rest of the paper strip. Since the paper strip forms the outer turns of the film-roll and the diameter of the turns of the film on the winding up spool have a smaller diameter than those of the feeding spool, it is subjected to a strain greater than that to which the film is subjected during the unwinding operation, the consequence being that at the picture window the film, being pressed by the tightly stretched paper strip, is not in a flat condition.

In order to avoid this drawback it has already been proposed to provide the protective paper strip with a transverse fold which can more or less be extended while the film passes from the feeding spool to the winding spool. This provision, however, is not satisfactory, for it may occur that the fold is checked by some protruding part of the camera, thus preventing the film from being unwound smoothly.

According to this invention the flat condition of the roll-film at the picture-window is secured in a very simple manner by making the paper strip of several connected parts, the anterior end being one part and the strip that covers the film over its whole length being a second part; the anterior part is attached to the film and a tongue-shaped extension of the second part is passed through a slit provided in the anterior part, and is fixed to the inner side of the latter. The second part may be of such length that its tail end extends beyond the unwound film, or it may be of substantially the same length as the film, in which case a third strip of paper is attached to the end of the film.

The invention is illustrated by the accompanying drawing.

The end of the film 1 is fixed by means of an adhesive strip 2 to the anterior end 3 of the protective paper strip which is to be introduced into the slit of the winding spool of the roll-film camera. The end of the second part 4 of the strip has a tongue 5. The length of this tongue 5 that is covered by the band 3 is indicated by dotted lines. Through the slit 6 provided in the strip 3 the tongue 5 is passed and is fixed to the inner side of the strip 3 by means of the adhesive strip 7.

In use, part 3 of the protective paper strip in the camera is wound up on the receiving spool. Between the adhesive strip 7 and the slit 6 the inner windings are formed by the tongue 5 and the outer ones by part 3. Thus part 3 of the protective paper strip and the film itself undergo a greater strain than the second part 4 of the protective paper strip. By this means the desired object is attained.

Instead of the adhesive strips referred to, direct attachment of the parts by any adhesive substance may be adopted.

What I claim is:

A photographic roll-film which comprises a film and a backing paper consisting of two parts, the first part including the anterior end connected with the film and the second part covering the film over its whole length having a tongue extending through a slit in the said first part, and fixed to the inner side of the latter.

EDUARD SCHNITZLER.